(12) United States Patent
Gotoh et al.

(10) Patent No.: US 8,310,248 B2
(45) Date of Patent: Nov. 13, 2012

(54) CAPACITIVE SENSOR DEVICE

(75) Inventors: Keisuke Gotoh, Toyohashi (JP);
Kentaro Mizuno, Nisshin (JP);
Norikazu Ohta, Aichi-gun (JP)

(73) Assignee: DENSO CORPORATION, Kariya (JP)

( * ) Notice: Subject to any disclaimer, the term of this patent is extended or adjusted under 35 U.S.C. 154(b) by 475 days.

(21) Appl. No.: 12/656,542

(22) Filed: Feb. 2, 2010

(65) Prior Publication Data
US 2010/0219848 A1 Sep. 2, 2010

(30) Foreign Application Priority Data

Feb. 12, 2009 (JP) .................................. 2009-30455

(51) Int. Cl.
*G01R 27/26* (2006.01)
(52) U.S. Cl. .......................... 324/686; 324/658; 324/669
(58) Field of Classification Search .......... 324/658–690; 73/780, 862.337, 862.626, 514.32, 718, 724
See application file for complete search history.

(56) References Cited

U.S. PATENT DOCUMENTS

| | | | | |
|---|---|---|---|---|
| 5,612,494 A * | 3/1997 | Shibano | ..................... | 73/514.32 |
| 5,661,240 A * | 8/1997 | Kemp | ....................... | 73/514.32 |
| 5,751,154 A * | 5/1998 | Tsugai | ........................ | 324/661 |
| 6,257,061 B1 * | 7/2001 | Nonoyama et al. | ........ | 73/514.32 |
| 6,483,322 B2 * | 11/2002 | Aoyama et al. | ................ | 324/661 |
| 6,668,614 B2 * | 12/2003 | Itakura | ............................ | 73/1.38 |
| 6,952,966 B2 * | 10/2005 | Itakura | ...................... | 73/514.32 |
| 7,078,916 B2 * | 7/2006 | Denison | ......................... | 324/661 |
| 7,339,384 B2 * | 3/2008 | Peng et al. | ..................... | 324/686 |
| 7,456,731 B2 * | 11/2008 | Umemura et al. | ............ | 340/436 |
| 7,652,486 B2 * | 1/2010 | Shikata | .......................... | 324/661 |
| 7,795,881 B2 * | 9/2010 | Masuda et al. | ................ | 324/661 |
| 2003/0011378 A1 * | 1/2003 | Ishio et al. | ..................... | 324/519 |
| 2003/0011384 A1 * | 1/2003 | Ishio et al. | ..................... | 324/661 |
| 2003/0090277 A1 * | 5/2003 | Lechner et al. | ................ | 324/686 |
| 2003/0155966 A1 * | 8/2003 | Harrison | ............................ | 330/9 |
| 2007/0146072 A1 * | 6/2007 | Ohta et al. | ..................... | 330/253 |
| 2008/0211544 A1 * | 9/2008 | Makino et al. | .................. | 327/59 |
| 2009/0002033 A1 * | 1/2009 | Nakatani et al. | ................ | 327/73 |
| 2010/0300203 A1 * | 12/2010 | Gotoh | ......................... | 73/504.15 |
| 2011/0109330 A1 * | 5/2011 | Ikuta et al. | ..................... | 324/686 |
| 2011/0248723 A1 * | 10/2011 | Yeh et al. | ....................... | 324/601 |

FOREIGN PATENT DOCUMENTS

| | | |
|---|---|---|
| JP | A-11-23608 | 1/1999 |
| JP | A-2008-64742 | 3/2008 |

* cited by examiner

*Primary Examiner* — Joshua Benitez Rosario
(74) *Attorney, Agent, or Firm* — Posz Law Group, PLC (57) ABSTRACT

A capacitive sensor device includes first and second sensor capacitors coupled in series, a clock signal generating part, an operational amplifier, a feedback capacitor, a compensating capacitor, and a compensating signal generating part. The clock signal generating part generates a first clock signal and the second clock signal applied to the first and second sensor capacitors, respectively. The compensating signal generating part generates a compensating signal applied to the compensating capacitor. The first clock signal and the second clock signal have the same frequency and the same amplitude and have phases being opposite each other. The compensating signal has a frequency same as the first clock signal and the second clock signal, has a phase same as one of the first clock signal and the second clock signal, and has an amplitude that is adjustable.

2 Claims, 5 Drawing Sheets

CAPACITIVE SENSOR DEVICE

CROSS REFERENCE TO RELATED APPLICATIONS

The present application is based on and claims priority to Japanese Patent Application No. 2009-30455 filed on Feb. 12, 2009, the contents of which are incorporated in their entirety herein by reference.

BACKGROUND OF THE INVENTION

1. Field of the Invention

The present invention relates to a capacitive sensor device.

2. Description of the Related Art

A capacitive sensor device for detecting various physical quantities such as a pressure, an acceleration, a vibration, and a sound pressure is known. This capacitive sensor device includes a pair of sensor capacitors. Electrostatic capacitances of these sensor capacitors are equal to each other in a state where the physical quantity is not applied and change in an increasing and decreasing relationship conflicting with each other in accordance with application of the physical quantity. Thus, the physical quantity applied to the capacitive sensor device can be detected with accuracy by converting a difference between the electrostatic capacitances of theses sensor capacitors into voltage.

The capacitive sensor device is ideally manufactured so that the electrostatic capacitances of the pair of sensor capacitors are equal in a state where the physical quantity is not applied. However, because there are manufacturing tolerances in these sensor capacitors, even in a state where the physical quantity is not applied to the capacitive sensor devices, there may be offset (mismatching) in the electrostatic capacitances of these sensor capacitors. It is difficult to distinguish the offset of the capacitances that exist irrelevant to the application of the physical quantity from a difference in the electrostatic capacitances caused by the application of the physical quantity in the output voltage of the capacitive sensor device, and it may cause a detection error of the physical quantity. Thus, a technique for compensating an offset of electrostatic capacitances of a pair of sensor capacitors has been developed.

Japanese Unexamined Patent Application Publication No. 2008-64742 discloses a technique for compensating an offset of electrostatic capacitances of a pair of sensor capacitors. In this technique, a plurality of compensating capacitors is formed on an element same as the pair of sensor capacitors. Then, in accordance with the actual offset of the electrostatic capacitances of the sensor capacitors, the electrostatic capacitances of the pair of sensor capacitors are adjusted to be equal to each other by cutting a wire in the compensating capacitors by a laser trimming or by adding a wire by bonding pad.

When the capacitive sensor device is used for a long term, the electrostatic capacitances of sensor capacitors may change across the ages. If the electrostatic capacitance of each of the pair of sensor capacitors changes across the ages, the offset of the electrostatic capacitances may also change. In the above-described technique, the electrostatic capacitors are adjusted irreversibly by cutting or adding wire. Thus, although the offset of the electrostatic capacitances at an adjusting stage in a manufacturing process of the capacitive sensor device can be compensated, it is difficult to compensate the offset when the offset of the electrostatic capacitances changes across the ages after that.

SUMMARY OF THE INVENTION

In view of the foregoing problems, it is an object of the present invention to provide a capacitive sensor device that can appropriately compensate an offset even in a case where a pair of sensor capacitors changes across the ages and the offset of electrostatic capacitances changes.

A capacitive sensor according to an aspect of the present invention includes a first sensor capacitor, a second sensor capacitor, a clock signal generating part, an operational amplifier, a feedback capacitor, a compensating capacitor, and a compensating signal generating part. The first sensor capacitor and the second sensor capacitor are coupled in series at a connection portion. The clock signal generating part generates a, first clock signal and a second clock signal. The first clock signal is applied to an open end of the first sensor capacitor. The second clock signal is applied to an open end of the second sensor capacitor. The operational amplifier includes an inverting input terminal, a non-inverting input terminal, and an output terminal. The inverting input terminal is coupled with the connection portion of the first sensor capacitor and the second sensor capacitor. The non-inverting input terminal is applied with a reference voltage. The feedback capacitor couples the output terminal and the inverting input terminal of the operational amplifier. The compensating capacitor is coupled with the connection portion of the first sensor capacitor and the second sensor capacitor. The compensating signal generating part generates a compensating signal applied to an open end of the compensating capacitor. The first sensor capacitor and the second sensor capacitor have electrostatic capacitances that change in accordance with an applied physical quantity. The first clock signal and the second clock signal have the same frequency and the same amplitude and have phases being opposite each other. The compensating signal has a frequency same as the first clock signal and the second clock signal, has a phase same as the first clock signal or the second clock signal, and has an amplitude that is adjustable.

In the capacitive sensor according to the aspect of the present invention, the amplitude of the compensating signal can be readjusted ex-post facto. Thus, in a case where the electrostatic capacitive sensor device is used for a long term and an offset of the electrostatic capacitances of the first sensor capacitor and the second sensor capacitor changes across the ages, an influence of the offset can be negated by adjusting the amplitude of the compensating signal again.

BRIEF DESCRIPTION OF THE DRAWINGS

Additional objects and advantages of the present invention will be more readily apparent from the following detailed description of exemplary embodiments when taken together with the accompanying drawings. In the drawings.

DETAILED DESCRIPTION OF THE EXEMPLARY EMBODIMENTS (First Embodiment)

Figure 1:
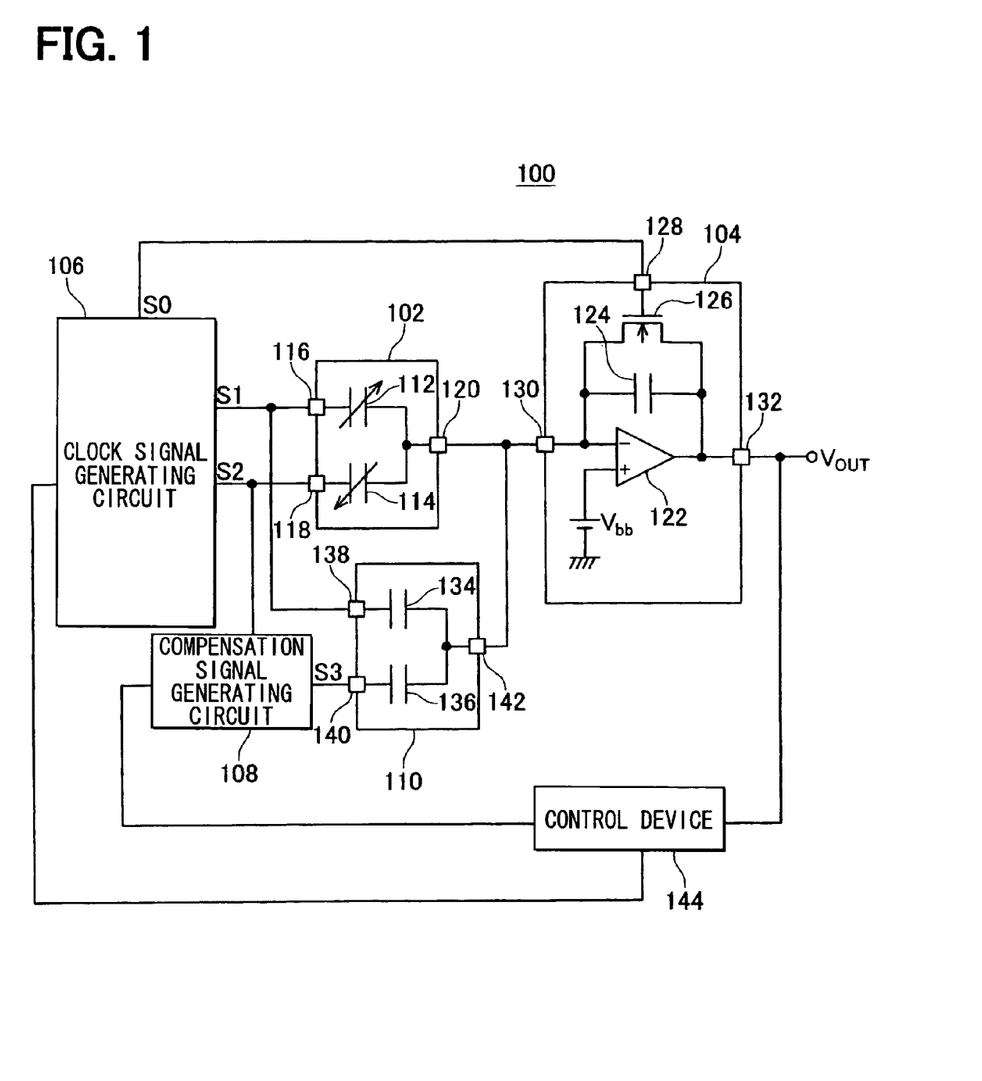
FIG. 1 is a circuit diagram showing a capacitive sensor device according to a first embodiment of the present invention.

A capacitive sensor device 100 according to a first embodiment of the present invention will be described with reference to FIG. 1. The capacitive sensor device 100 includes a sensor element 102, a CV converting circuit 104, a clock signal generating circuit 106, a compensating signal generating circuit 108, an offset compensating circuit 110. The capacitive sensor device 100 detects a change in a physical quantity applied to the sensor element 102 as an electrostatic capacitance change, and the CV converting circuit 104 outputs the electrostatic capacitance change in the sensor element 102, as a voltage change. An operation of the capacitive sensor device 100 is controlled by a control device 144. The physical quantity includes, for example, a pressure, an acceleration, a vibration, and a sound pressure.

The sensor element 102 includes a first sensor capacitor 112 and a second sensor capacitor 114. The first sensor capacitor 112 and the second sensor capacitor 114 have a common movable electrode and fixed electrodes individually provided. The movable electrode and the fixed electrodes are arranged at positions opposing each other. When the physical quantity is applied to the sensor element 102, the movable electrode displaces, and each of the electrostatic capacitances of the first sensor capacitor 112 and the second sensor capacitor 114 changes.

In the present embodiment, the electrostatic capacitance $C_1$ of the first sensor capacitor 112 is expressed as the sum of an electrostatic capacitance $C_{01}$ in a case where the physical quantity is not applied and an electrostatic capacitance change $\Delta C_1$ due to the application of the physical quantity. In addition, the electrostatic capacitance $C_2$ of the second sensor capacitor 114 is expressed as the sum of an electrostatic capacitance $C_{02}$ in a case where the physical quantity is not applied and an electrostatic capacitance change $\Delta C_2$ due to the application of the physical quantity. That is, $C_1=C_{01}+\Delta C_1$ and $C_2=C_{02}+\Delta C_2$.

The first sensor capacitor 112 and the second sensor capacitor 114 are manufactured ideally so that the electrostatic capacitances in a case where the physical quantity is not applied are equal, that is, $C_{01}=C_{02}$. In addition, the first sensor capacitor 112 and the second sensor capacitor 114 are manufactured ideally so that changes in the electrostatic capacitances in a case where the physical quantity is applied become an increasing and decreasing relationship conflicting with each other, that is, $\Delta C_1=-\Delta C_2$.

The fixed electrode of the first sensor capacitor 112 is coupled with a first, input terminal 116. The fixed electrode of the second sensor capacitor 114 is coupled with a second input terminal 118. The common movable electrode of the first sensor capacitor 112 and the second sensor capacitor 114 is coupled with an output terminal 120.

Figure 2:
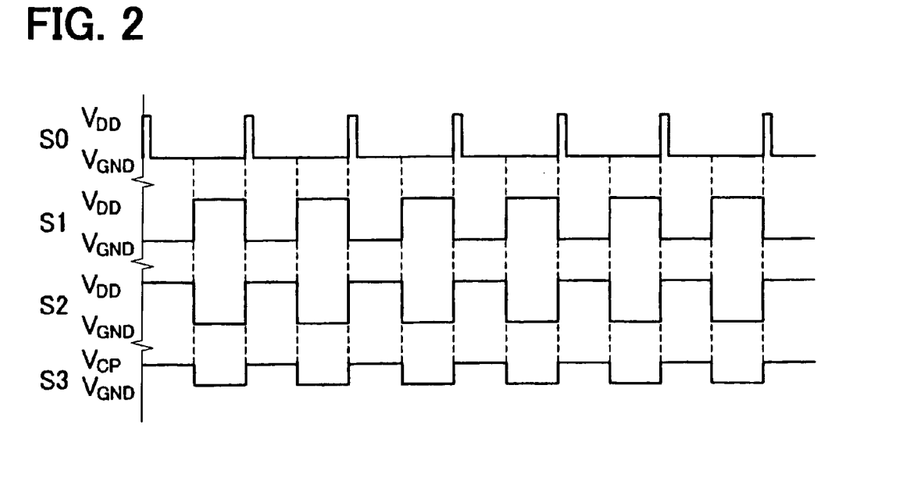
FIG. 2 is a diagram showing an exemplary relationship among signals in the capacitive sensor device according to the first embodiment.

The clock signal generating circuit 106 supplies a clock signal S1 to the first input terminal 116 of the sensor element 102 and supplies a clock signal S2 to the second input terminal 118 of the sensor element 102. As shown in FIG. 2, the signal S1 alternately repeats a power source voltage ($V_{DD}$) and a ground voltage ($V_{GND}$). The signal S2 alternately repeats $V_{DD}$ and $V_{GND}$, too. The signal S1 and the signal S2 have opposite phases, and when one of the signals is $V_{DD}$, the other one is $V_{GND}$. The clock signal generating circuit 106 also supplies a reset signal S0 to a reset terminal 128 of the CV converting circuit 104. In the present embodiment, the reset signal becomes $V_{DD}$ only for a short time just after the clock signal S1 changes from $V_{DD}$ to $V_{GND}$ and the reset signal becomes $V_{GND}$ after that. Start and end of an operation of the clock signal generating circuit 106 is controlled by the control device 144.

The CV converting circuit 104 includes an operational amplifier 122, a feedback capacitor 124, and a switch circuit 126. To a non-inverting input terminal of the operational amplifier 122, a reference voltage ($V_{bb}$) is applied. $V_{bb}$ is a potential that is intermediate between $V_{DD}$ and $V_{GND}$. That is, $V_{bb}=(V_{DD}+V_{GND})/2$. The feedback capacitor 124 and the switch circuit 126 are coupled in parallel between an inverting input terminal and an output terminal of the operational amplifier 122. The switch circuit 126 is a switch circuit configured by an N type MOSFET. The switch circuit 126 switches between a conductive state and a non-conductive state based on the reset signal S0 input to the reset terminal 128. When the reset signal S0 is $V_{DD}$, the switch circuit 126 becomes conductive. When the reset signal S0 is $V_{GND}$, the switch circuit 126 becomes non-conductive. When the switch circuit 126 becomes conductive, both ends of the feedback capacitor 124 short, and an electric charge stored in the feedback capacitor 124 is discharged. An input terminal 130 of the CV converting circuit 104 is coupled with the output terminal 120 of the sensor element 102. An output terminal 132 of the CV converting circuit 104 is coupled with an output terminal of the capacitive sensor device 100, and an output voltage $V_{out}$ of the CV converting circuit 104 becomes an output voltage of the capacitive sensor device 100.

When the signal S1 becomes $V_{GND}$ and the signal S2 becomes $V_{DD}$, a voltage is applied to each of the first sensor capacitor 112 and the second sensor capacitor 114. An electric potential of the common movable electrode of the first sensor capacitor 112 and the second sensor capacitor 114 are equal to an electric potential of the inverting input terminal of the operational amplifier 122. The electric potential of the inverting input terminal of the operational amplifier 122 is equal to $V_{bb}$ applied to the non-inverting input terminal of the operational amplifier. Thus, the voltage $V_1=V_{GND}-V_{bb}=-V_{bb}$ is applied to the first sensor capacitor 112, and the voltage $V_2=V_{DD}-V_{bb}=V_{bb}$ is applied to the second sensor capacitor 114. The first sensor capacitor 112 stores an electric charge $Q_1=C_1V_1=-C_1V_{bb}$, and the second sensor capacitor 114 stores an electric charge $Q_2=C_2V_2=C_2V_{bb}$. Just after the signal S1 changes into $V_{GND}$, the reset signal S0 becomes $V_{DD}$, and the switch circuit 126 becomes conductive. Since the switch circuit 126 becomes conductive, both ends of the feedback capacitor 124 short, and the output voltage $V_{out}$ becomes $V_{out}=V_{bb}$. After that, even if the reset signal S0 becomes $V_{GND}$ and the switch circuit 126 becomes non-conductive, since the electric charges of the first sensor capacitor 112 and the second sensor capacitor 114 do not change, an electric charge is not stored in the feedback capacitor 124, the output voltage $V_{out}$ remains $V_{bb}$.

When the signal S1 changes into $V_{DD}$ and the signal S2 changes into $V_{GND}$, the voltage $V_1=V_{DD}-V_{bb}=V_{bb}$ is applied to the first sensor capacitor 112 and the voltage $V_2=V_{GND}-V_{bb}=-V_{bb}$ is applied to the second sensor capacitor 114. The first sensor capacitor 112 stores the electric charge $Q_1=C_1V_1=C_1V_{bb}$, and the second sensor capacitor 114 stores the electric charge $Q_2=C_2V_2=-C_2V_{bb}$. Thus, when the signal S1 changes into $V_{DD}$ and the signal S2 changes into $V_{GND}$, the amount of change in the electric charge of the first sensor capacitor 112 is $\Delta Q_1 = C_1 V_{bb} + C_1 V_{bb} = 2C_1 V_{bb}$ and the amount of change in the electric charge of the second sensor capacitor 114 is $\Delta Q_2 = -C_2 V_{bb} - C_2 V_{bb} = -2C_2 V_{bb}$. Because these electric charges are supplied from the feedback capacitor 124, the feedback capacitor 124 stores an electric charge $Q_f = \Delta Q_1 + \Delta Q_2 = 2(C_1 - C_2) V_{bb}$. Because the electric potential of the non-inverting input terminal of the operational amplifier 122 is $V_{bb}$, in a case where the compensating signal generating circuit 108 and the offset compensating circuit 110 do not present, the output voltage $V_{out}$ is given by $V_{out} = V_{bb} - Q_f/C_f = V_{bb} - 2V_{bb}(C_1 - C_2)/C_f = V_{bb} - 2V_{bb}$ $(C_{01} - C_{02} + \Delta C_1 - \Delta C_2)/C_f$. Where, $C_f$ is an electrostatic capacitance of the feedback capacitor 124. The amount of change $2V_{bb}(C_{01} - C_{02} + \Delta C_1 - \Delta C_2)/C_f$ of the output voltage $V_{out}$ from the reference voltage $V_{bb}$ changes in accordance with the change in the electrostatic capacitances.

If the electrostatic capacitances of the first sensor capacitor 112 and the second sensor capacitors when the physical quantity is not applied to the sensor element 102 correspond to each other, that is, if $C_{01} = C_{02}$, the output voltage $V_{out}$ of the capacitive sensor device 100 changes from $V_{bb}$ as reference by $2V_{bb}(\Delta C_1 - \Delta C_2)/C_f$ concurrently with the change of the signal S1 between $V_{DD}$ and $V_{GND}$. The physical quantity applied to the sensor element 102 can be detected by measuring the change in the output voltage $V_{out}$. However, because the first sensor capacitor 112 and the second sensor capacitor 114 have manufacturing tolerances, actually, $C_{01}$ and $C_{02}$ do not correspond to each other. Thus, the capacitive sensor device 100 according to the present embodiment removes an influence of an offset of the electrostatic capacitances of the first sensor capacitor 112 and the second sensor capacitor 114 using the compensating signal generating circuit 108 and the offset compensating circuit 110.

The offset compensating circuit 110 includes a first compensating capacitor 134 and a second compensating capacitor 136. An electrostatic capacitance $C_{c1}$ of the first compensating capacitor 134 is set to be larger than the absolute value $|C_{01} - C_{02}|$ of the offset of the electrostatic capacitance that is assumed with regard to the first sensor capacitor 112 and the second sensor capacitor 114. An electrostatic capacitance $C_{c2}$ of the second compensating capacitor 136 is set to be twice as large as the electrostatic capacitance $C_{c1}$ of the first compensating capacitor 134. That is, $C_{c2} = 2C_{c1}$.

One end of the first compensating capacitor 134 is coupled with a first input terminal 138 of the offset compensating circuit 110. To the first input terminal 138 of the offset compensating circuit 110, the clock signal S1 is input from the clock signal generating circuit 106. One end of the second compensating capacitor 136 is coupled with a second input terminal 140 of the offset compensating circuit 110. To the second input terminal 140 of the offset compensating circuit 110, a compensating signal S3 is input from the compensating signal generating circuit 108. Each of the other end of the first compensating capacitor 134 and the other end of the second compensating capacitor 136 are coupled with an output terminal 142 of the offset compensating circuit 110. The output terminal 142 of the offset compensating circuit 110 is coupled with the input terminal 130 of the CV converting circuit 104.

The compensating signal generating circuit 108 is input the clock signal S2 from the clock signal generating circuit 106 and outputs the compensating signal S3 to the offset compensating circuit 110. As shown in FIG. 2, the compensating signal S3 changes in the same phase with the clock signal S2. The compensating signal S3 is $V_{GND}$ when the signal S2 is $V_{GND}$, and the compensating signal S3 is $V_{cp}$ when the signal S2 is $V_{DD}$. A compensating voltage $V_{cp}$ is a voltage smaller than $V_{DD}$ and larger than $V_{GND}$, and its magnitude is adjustable. The magnitude of the compensating voltage $V_{cp}$ is adjusted by the control device 144.

When the signal S1 is $V_{GND}$ and the signal S2 is $V_{DD}$, the compensating signal S3 is $V_{cp}$. An electric potential of the output terminal 142 to which each of the first compensating capacitor 134 and the second compensating capacitor 136 is coupled is equal to the electric potential of the inverting input terminal of the operational amplifier 122 and is equal to $V_{bb}$ applied to the non-inverting input terminal of the operational amplifier 122. Thus, a voltage $V_{c1} = V_{GND} - V_{bb} = -V_{bb}$ is applied to the first compensating capacitor 134 and a voltage $V_{c2} = V_{cp} - V_{bb}$ is applied to the second compensating capacitor 136. The first compensating capacitor 134 stores an electric charge $Q_{c1} = C_{c1} V_{c1} = -C_{c1} V_{bb}$, and the second compensating capacitor 136 stores an electric charge $Q_{c2} = C_{c2} V_{c2} = 2C_{c1}(V_{cp} - V_{bb})$. When these electric charges are stored, the reset signal S0 becomes $V_{DD}$ at substantially the same time, and the switch circuit 126 becomes conductive. After that, even if the reset signal S0 becomes $V_{GND}$ and the switch circuit 126 becomes non-conductive, since the electric charges of the first compensating capacitor 134 and the second compensating capacitor 136 do not change, the electric charge is not stored in the feedback capacitor 124, and the output voltage $V_{out}$ remains $V_{bb}$.

When the signal S1 changes into $V_{DD}$ and the signal S2 changes into $V_{GND}$, the compensating signal S3 changes into $V_{GND}$. In this case, the voltage $V_{c1} = V_{DD} - V_{bb} = V_{bb}$ is applied to the first compensating capacitor 134 and the voltage $V_{c2} = V_{GND} - V_{bb} = -V_{bb}$ is applied to the second compensating capacitor 136. The first compensating capacitor 134 stores the electric charge $Q_{c1} = C_{c1} V_{c1} = C_{c1} V_{bb}$, and the second compensating capacitor 136 stores the electric charge $Q_{c2} = C_{c2} V_{c2} = -2C_{c1} V_{bb}$. Thus, when the signal S1 changes into $V_{DD}$ and the signal S2 changes into $V_{GND}$, the amount of change in the electric charge of the first compensating capacitor 112 is $\Delta Q_{c1} = C_{c1} V_{bb} + C_{c1} V_{bb} = 2C_{c1} V_{bb}$ and the amount of change in the electric charge of the second compensating capacitor 114 is $\Delta Q_{c2} = -2C_{c1} V_{bb} - 2C_{c1}(V_{cp} - V_{bb}) = -2C_{c1} V_{cp}$. Because these electric charges are also supplied from the feedback capacitor 124, in addition to the electric charge from the sensor element 102, the feedback capacitor 124 stores the electric charge $Q_f = \Delta Q_1 + \Delta Q_2 + \Delta Q_{c1} + \Delta Q_{c2} = 2(C_1 - C_2) V_{bb} - 2C_{c1}(V_{cp} - V_{bb})$. Because the electric potential of the inverting input terminal of the operational amplifier 122 is $V_{bb}$, the output voltage $V_{out}$ is given by $V_{out} = V_{bb} - Q_f/C_f = V_{bb} - 2V_{bb}(C_1 - C_2)/C_f + 2(V_{cp} - V_{bb})C_{c1}/C_f = V_{bb} - 2V_{bb}(\Delta C_1 - \Delta C_2)/C_f V_{os}$. Where, $V_{os} = -2V_{bb}(C_{01} - C_{02})/C_f + 2(V_{cp} - V_{bb})C_{c1}/C_f$.

If the magnitude of the compensating voltage $V_{cp}$ is adjusted so that $V_{os} = 0$, the output voltage $V_{out}$ changes from $V_{bb}$ as a reference by $-2V_{bb}(\Delta C_1 - \Delta C_2)/C_f$, and the physical quantity applied to the sensor element 102 can be detected from the change in the output voltage $V_{out}$. The magnitude of the compensating voltage $V_{cp}$ is give by $V_{cp} = V_{bb}(1 + (C_{01} - C_{02})/C_{c1})$. By using the compensating signal S3 having the compensating voltage $V_{cp}$ adjusted by this way, the influence of the offset $(C_{01} - C_{02})$ of the electrostatic capacities of the first sensor capacitor 112 and the second sensor capacitor 114 is removed from the change in the output voltage $V_{out}$, and the physical quantity applied to the sensor element 102 can be detected with accuracy. If a measurement of $C_{01}$ and $C_{02}$ is possible, the magnitude of the compensating voltage $V_{cp}$ can be calculated using the measured values, $V_{bb}$, and $C_{c1}$. Alternatively, without measuring $C_{01}$ and $C_{02}$, the magnitude of $V_{cp}$ may be gradually changed, and $V_{cp}$ with which $V_{os} = 0$ may be determined exploratively.

Figure 3:
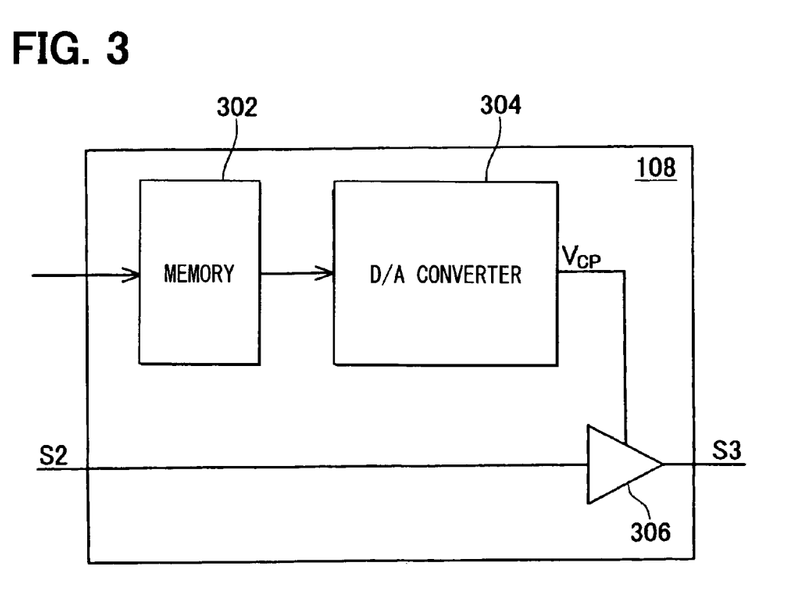
FIG. 3 is a circuit diagram showing a compensating signal generating circuit according to the first embodiment.

As shown in FIG. 3, the compensating signal generating circuit 108 includes a memory 302, a D/A converter 304, and a buffer circuit 306. The control device 144 stores a numerical value of the compensating voltage $V_{cp}$ in the memory 302 as digital data. The D/A converter 304 reads the value of the compensating voltage $V_{cp}$ from the memory 302, converts into analog voltage, and applies to the buffer circuit 306.

Figure 4:
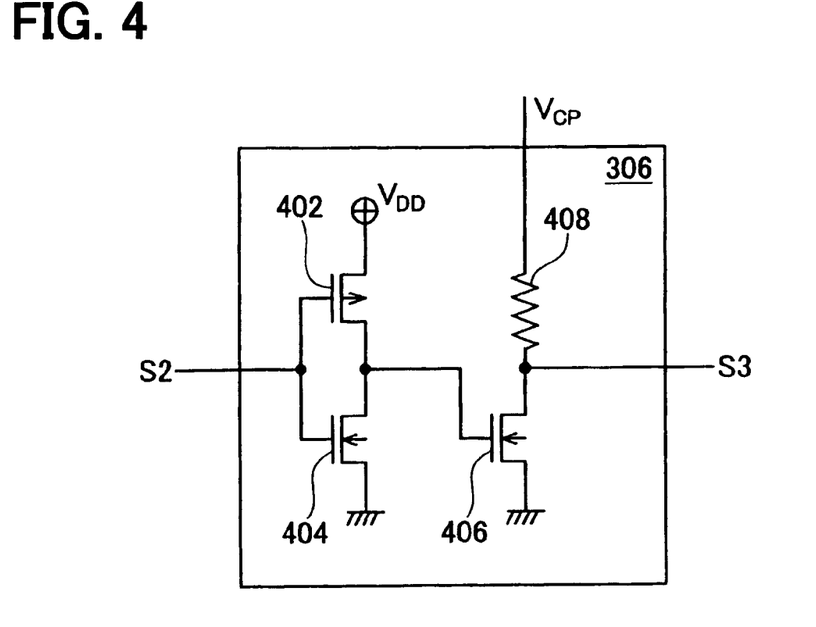
FIG. 4 is a circuit diagram showing a buffer circuit according to the first embodiment.

As shown in FIG. 4, the buffer circuit 306 is a two-stage inverter circuit including a P type MOSFET 402, N type MOSFETs 404, 406, and a resistor 408. In a case where the signal S2 is $V_{GND}$, the buffer circuit 306 outputs $V_{GND}$ as the compensating signal S3. In a case where the signal S2 is $V_{DD}$, the buffer circuit 306 outputs $V_{cp}$ as the compensating signal S3.

The control device 144 includes an A/D converter and a logic operation circuit which are not shown. The control device 144 converts the output voltage $V_{out}$ of the capacitive sensor device 100 into digital data and executes a below-mentioned automatic offset compensating process in accordance with a measured value of the output voltage $V_{out}$.

Figure 5:
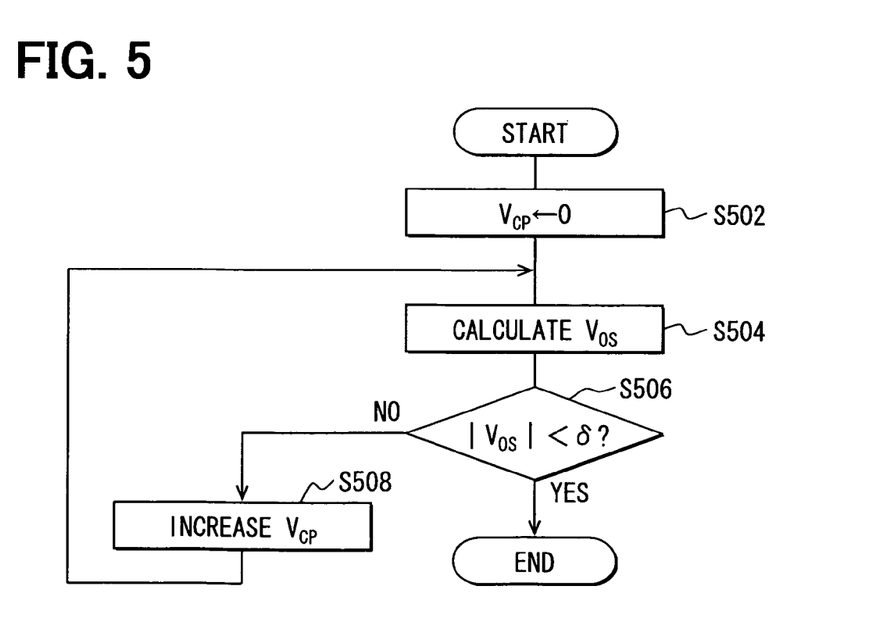
FIG. 5 is a flowchart showing an automatic offset compensating process executed by the capacitive sensor device according to the first embodiment.

The automatic offset compensating process in the capacitive sensor device 100 according to the present embodiment will be described below with reference to FIG. 5. The automatic offset compensating process is performed in a state where the physical quantity applied to the sensor element 102 is zero.

At S502, the control device 144 stores zero (i.e., $V_{GND}$) in the memory 302 as an initial value of $V_{cp}$.

At S504, the control device 144 calculates the amount $V_{os}$ of change in the output voltage due to the offset of the electrostatic capacitances. The amount $V_{os}$ of change in the output voltage is calculated by measuring $V_{out}$ during a time when the signal S1 is $V_{DD}$ and $V_{out}$ during a time when the signal S2 is $V_{GND}$ and by calculating the difference between both of them.

At S506, the control device 144 determines whether the magnitude of $V_{os}$ is less than a predetermined value $\delta$ or not. When the magnitude of $V_{os}$ is greater than or equal to the predetermined value $\delta$ (which corresponds to NO at S506), the control device 144 determines that further update of $V_{cp}$ is required and proceeds to S508.

At S508, the control device 144 reads $V_{cp}$ stored in the memory 302, and writes a numerical value that is increased by a predetermined voltage increased amount $\Delta V_{cp}$ in the memory 302 as a new $V_{cp}$. After S508, the process returns to S504.

At S506, when the magnitude of $V_{os}$ is less the predetermined value $\delta$ (which corresponds to YES at S506), the control device 144 determines that $V_{cp}$ is appropriately set and ends the automatic offset compensating process.

As described above, in the capacitive sensor device 100 according to the present embodiment, the offset of the electrostatic capacitances of the first sensor capacitor 112 and the second sensor capacitor 114 are compensated and the physical quantity applied to the sensor element 102 can be detected with accuracy.

In the capacitive sensor device 100 according to the present embodiment, the magnitude of the compensating voltage $V_{cp}$ can be readjusted ex-post facto in the compensating signal generating circuit 108. Thus, even in a case where the sensor element 102 is used for a long term, and the offset of the electrostatic capacitances of the first sensor capacitor 112 and the second sensor capacitor 114 changes across the ages, the influence of the offset can be negated by readjusting the magnitude of the compensating voltage $V_{cp}$.

(Second Embodiment)

Figure 6:
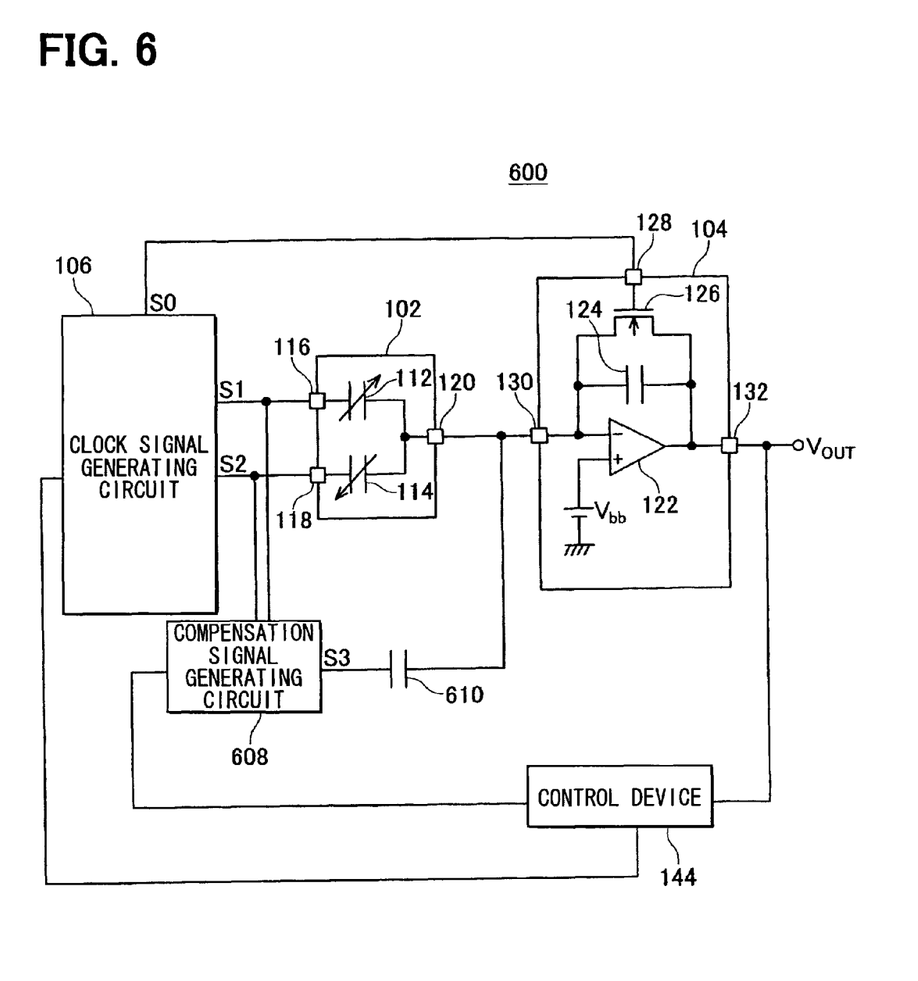
FIG. 6 is a circuit diagram showing a capacitive sensor device according to a second embodiment of the present invention.

A capacitive sensor device 600 according to a second embodiment of the present invention will be described with reference to FIG. 6. The capacitive sensor device 600 according to the present invention includes a compensating signal generating circuit 608 and a compensating capacitor 610 instead of the compensating signal generating circuit 108 and the offset compensating circuit 110 in the capacitive sensor 100 according to the first embodiment.

An electrostatic capacitance $C_c$ of the compensating capacitor 610 is set to be larger than the absolute value $|C_{01} - C_{02}|$ of the offset of the electrostatic capacitance that is assumed with regard to the first sensor capacitor 112 and the second sensor capacitor 114. To one end of the compensating capacitor 610, the compensating signal S3 is input from the compensating signal generating circuit 108. The other end of the compensating capacitor 610 is coupled with the input terminal 130 of the CV converting circuit 104.

Figure 7:
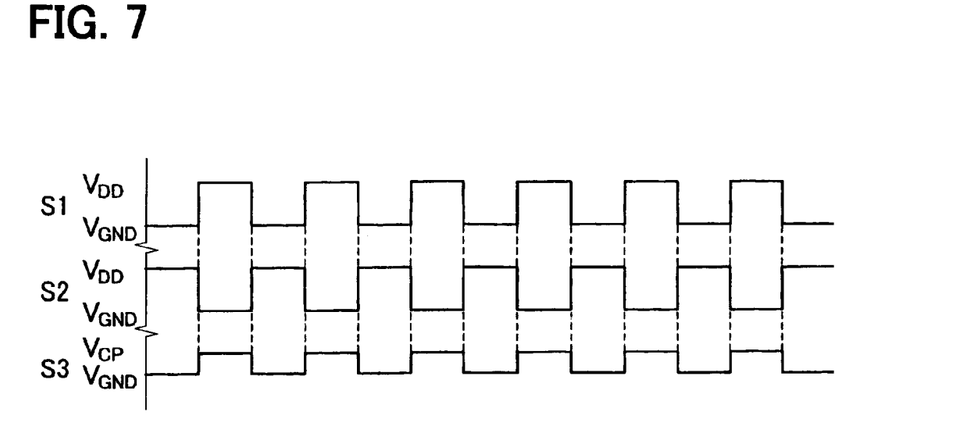
FIG. 7 is a diagram showing an exemplary relationship among signals in the capacitive sensor device according to the second embodiment.
Figure 8:
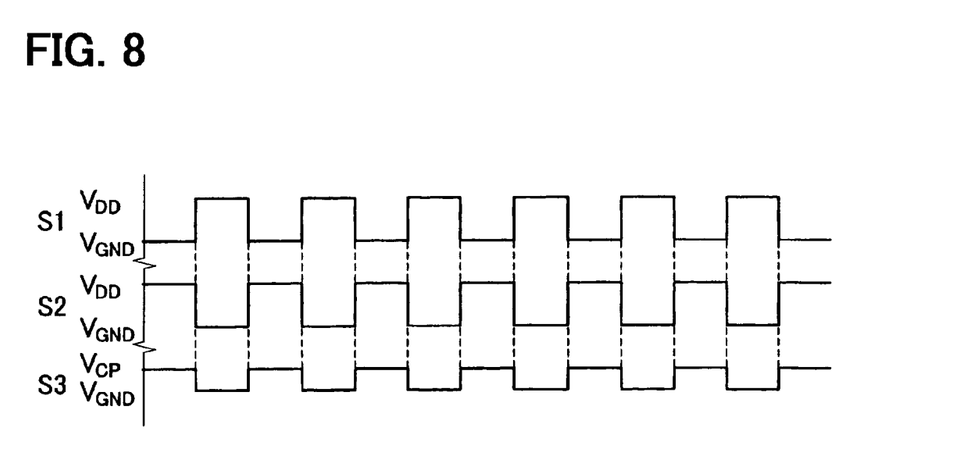
FIG. 8 is a diagram showing another exemplary relationship among signals in the capacitive sensor device according to the second embodiment.

The compensating signal generating circuit 608 is input the clock signals S1 and S2 from the clock signal generating circuit 106 and outputs the compensating signal S3 to the compensating capacitor 610. In the present embodiment, the compensating signal S3 may change in the same phase with the clock signal S1, and the compensating signal S3 may change in the same phase with the clock signal S2. When $C_{01}$ is smaller than $C_{02}$, as shown in FIG. 7, the compensating signal S3 changes in the same phase with the clock signal S1. In this case, the compensating signal S3 is $V_{GND}$ when the signal S1 is $V_{GND}$, and the compensating signal S3 is $V_{cp}$ when the signal S1 is $V_{DD}$. When $C_{01}$ is larger than $C_{02}$, as shown in FIG. 8, the compensating signal S3 changes in the same phase with the clock signal S2. In this case, the compensating signal S3 is $V_{GND}$ when the signal S2 is $V_{GND}$, and the compensating signal S3 is $V_{cp}$ when the signal S2 is $V_{DD}$.

A case where $C_{01}$ is smaller than $C_{02}$ will be described below. In this case, the compensating signal S3 changes in the same phase with the signal S1. When the signal S1 is $V_{GND}$ and the signal S2 is $V_{DD}$, a voltage $V_c = V_{GND} - V_{bb} = -V_{bb}$ is applied to the compensating capacitor 610, and an electric charge $Q_c = C_c V_c = -C_c V_{bb}$ is stored. After that, when the signal S1 changes into $V_{DD}$ and the signal S2 changes into $V_{GND}$, a voltage $V_c = V_{cp} - V_{bb}$ is applied to the compensating capacitor 610 and an electric charge $Q_c = C_c V_c = C_c(V_{cp} - V_{bb})$ is stored. The amount of change in the electric charge of the compensating capacitor 610 at this time is $\Delta Q_c = C_c(V_{cp} - V_{bb}) + C_c V_{bb} = C_c V_{cp}$. In the feedback capacitor 124, the electric charge $Q_f = \Delta Q_1 + \Delta Q_2 + \Delta Q_c = 2(C_1 - C_2)V_{bb} + C_c V_{cp}$ is stored. The output voltage $V_{out}$ at this time is given by $V_{out} = V_{bb} - Q_f/C_f = V_{bb} - 2V_{bb}(C_1 - C_2)/C_f - V_{cp}C_c/C_f = V_{bb} - 2V_{bb}(\Delta C_1 - \Delta C_2)C_f + V_{os}$. Where, $V_{os} = 2V_{bb}(C_{02} - C_{01})/C_f - V_{cp}C_c - C_f$. Thus, by adjusting $V_{cp} = 2V_{bb}(C_{02} - C_{01})/C_{c1} V_{os} = 0$, and the output voltage $V_{out}$ changes in accordance with $\Delta C_1 - \Delta C_2$.

A case where $C_{01}$ is larger than $C_{02}$ will be described below. In this case, the compensating signal S3 changes in the same phase with the signal S2. When the signal S1 is $V_{GND}$ and the signal S2 is $V_{DD}$, a voltage $V_c = V_{cp} - V_{bb}$ is applied to the compensating capacitor 610 and an electric charge $Q_c = C_c V_c = C_c(V_{cp} - V_{bb})$ is stored. After that, when the signal S1 changes into $V_{DD}$ and the signal S2 changes into $V_{GND}$, a voltage $V_c = V_{GND} - V_{bb} = -V_{bb}$ is applied to the compensating capacitor 610, and an electric charge $Q_c = C_c V_c = -C_c V_{bb}$ is stored. The amount of change in the electric charge of the compensating capacitor 610 at this time is $\Delta Q_c = -C_c V_{bb} - C_c(V_{cp} - V_{bb}) = -C_c V_{cp}$. In the feedback capacitor 124, the electric charge $Q_f = \Delta Q_1 + \Delta Q_2 + \Delta Q_c = 2(C_1 - C_2)V_{bb} - C_c V_{bb}$ is stored. The output voltage $V_{out}$ at this time is given by $V_{out} = V_{bb} - Q_f/C_f = V_{bb} - 2V_{bb}(C_1 - C_2)/C_f + V_{cp}C_c/C_f = V_{bb} -$ $2V_{bb}(\Delta C_1 - \Delta C_2)/Cf + V_{os}$. Where, $V_{os} = 2V_{bb}(C_{01} - C_{02})/C_f + V_{cp}C_c/C_f$. Thus, by adjusting $V_{cp} = 2V_{bb}(C_{01} - C_{02})/C_c$, $V_{os} = 0$, and the output voltage $V_{out}$ changes in accordance with $\Delta C_1 - \Delta C_2$.

If a measurement of $C_{01}$ and $C_{02}$ is possible, the phase of the compensating signal S3 and the magnitude of the compensating voltage $V_{cp}$ may be determined based on the measured values. Alternatively, without measuring $C_{01}$ and $C_{02}$, the magnitude of $V_{cp}$ may be gradually changed and $V_{cp}$ with which $V_{os} = 0$ may be determined exploratively in each of a case where the phase of the compensating signal S3 is corresponded to the signal S1 and a case where the phase of the compensating signal S3 is corresponded to the signal S2.

As described above, also in the capacitive sensor device 600 according to the present embodiment, the offset of the electrostatic capacitances of the first sensor capacitor and the second sensor capacitor are compensated and the physical quantity applied to the sensor element 102 can be detected with accuracy.

In the capacitive sensor device 600 according to the present embodiment, the phase of the compensating signal S3 and the magnitude of the compensating voltage $V_{cp}$ in the compensating signal generating circuit 608 can be readjusted ex-post facto. Thus, even in a case where the sensor element 102 is used for a long term, and the offset of the electrostatic capacitances of the first sensor capacitor 112 and the second sensor capacitor 114 changes across the ages, the influence of the offset can be negated.

Although the examples of the present invention have been described in detail above, these are only exemplification and do not limit a scope of claims. Various changes and modifications of the examples are included in the technology described in claims.

What is claimed is:

1. A capacitive sensor device comprising:
    a first sensor capacitor and a second sensor capacitor coupled in series at a connection portion;
    a clock signal generating part that generates a first clock signal and a second clock signal, the first clock signal applied to an open end of the first sensor capacitor, the second clock signal applied to an open end of the second sensor capacitor;
    an operational amplifier having an inverting input terminal, a non-inverting input terminal, and an output terminal, the inverting input terminal coupled with the connection portion of the first sensor capacitor and the second sensor capacitor, the non-inverting input terminal applied with a reference voltage;
    a feedback capacitor coupling the output terminal and the inverting input terminal of the operational amplifier;
    a compensating capacitor coupled with the connection portion of the first sensor capacitor and the second sensor capacitor; and
    a compensating signal generating part that generates a compensating signal applied to an open end of the compensating capacitor, wherein:
    the first sensor capacitor and the second sensor capacitor have electrostatic capacitances that change in accordance with an applied physical quantity;
    the first clock signal and the second clock signal have a same frequency and a same amplitude and have phases being opposite each other; and
    the compensating signal has a frequency same as the first clock signal and the second clock signal, has a phase same as the first clock signal or the second clock signal, and has an amplitude that is adjustable.

2. The capacitive sensor device according to claim 1, further comprising another compensating capacitor coupled with the connection portion of the first sensor capacitor and the second sensor capacitor, wherein
    an electrostatic capacitance of the another compensating capacitor is set to be smaller than an electrostatic capacitance of the compensating capacitor, and the first clock signal or the second clock signal having an opposite phase with the compensating signal is applied to an open end of the another compensating capacitor.

* * * * *